UNITED STATES PATENT OFFICE.

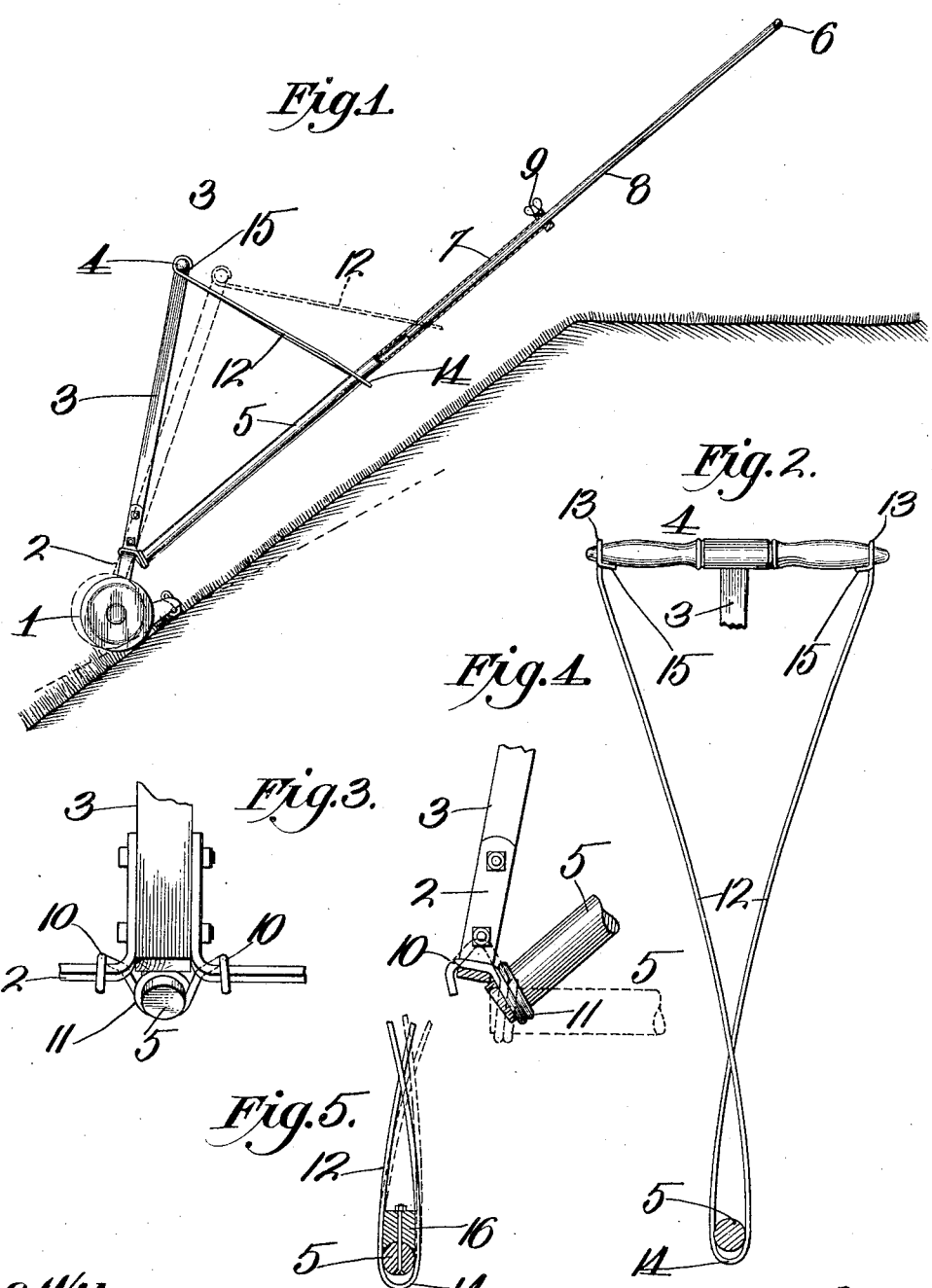

JUSTIN E. PAGE, OF KANSAS CITY, MISSOURI.

AUXILIARY HANDLE FOR LAWN-MOWERS.

1,084,165.  Specification of Letters Patent.  Patented Jan. 13, 1914.

Application filed January 2, 1912. Serial No. 669,116.

*To all whom it may concern:*

Be it known that I, JUSTIN E. PAGE, a citizen of the United States, residing at Kansas City, in the county of Jackson and State of Missouri, have invented certain new and useful Improvements in Auxiliary Handles for Lawn-Mowers, of which the following is a specification.

This invention relates to auxiliary handles for lawn mowers and has for its object to produce a handle whereby an ordinary lawn mower can be easily and efficiently employed on a terrace of any grade or inclination from the sidewalk or from the top of the terrace.

A further object is to produce an auxiliary handle which can be easily and quickly applied to or removed from the lawn mower and which is of simple, strong, durable and cheap construction.

With these objects in view the invention consists in certain novel and peculiar features of construction and organization as hereinafter described and claimed; and in order that it may be fully understood reference is to be had to the accompanying drawing, in which—

Figure 1, is a side elevation with the handle partly in section of a lawn mower equipped with an auxiliary handle embodying my invention, the mower being shown in operative position upon a terrace. Fig. 2, is an enlarged view showing the auxiliary handle in section, the upper part of the main handle of the mower, and a brace connecting the auxiliary handle with the handle bar of the main handle. Fig. 3, is a detail view showing the front ends of the main handle and auxiliary handle and also showing a part of the yoke of the mower and the connection for uniting the front end of the auxiliary handle to the yoke. Fig. 4, is a side view of the construction shown by Fig. 3. Fig. 5, is a view similar to the lower part of Fig. 2, and showing means secured to the auxiliary handle for securing the same in substantially fixed relation as regards lateral movement to the main handle.

In the said drawing, 1 indicates the body of a lawn mower, 2 the yoke, 3 the main handle, and 4 the handle bar of said mower. 5 indicates the auxiliary handle provided at its rear end with a transverse handle bar 6. In Fig. 1, the auxiliary handle is shown as of telescopic construction, the front member 7 being shown as tubular and the rear member 8, fitting adjustably therein and adapted to be secured at the desired point of adjustment by set screw 9 carried by member 7 and impinging on member 8. In practice the cheaper and therefore the preferred construction will be to have the auxiliary handle in the form of a single bar or rod as only in exceptional cases should it be desirable to make said handle extensible.

The auxiliary handle is arranged in the same vertical plane as and below the main handle and extends at an acute angle with respect to the latter and at its front end the auxiliary handle is equipped with means for detachably securing it in fixed and juxtaposed relation to the front end of the main handle. The preferred means for connecting the front end of the auxiliary handle to the mower consists of a pair of downwardly opening hooks 10, which engage the yoke 2, at opposite sides of and adjacent to the front end of the main handle, said hooks preferably constituting the ends or extremities of a clamp or coil 11, secured tightly upon the front end of the main handle, the arrangement being such that when the handles are disposed at substantially a right angle to each other as indicated by the full line position of handle 3 and the dotted line position of handle 5— Fig. 4— the front end of handle 5 can be raised and thus withdraw the hooks 10 from engagement with the yoke, it being noted that when the handles are in operative relation, that is extend at a decided acute angle to each other as in full lines, Fig. 1 and Fig. 4, the front extremity of handle 5 slightly underlies the front end of handle 3 and guards against such accidental upward movement of the former as would effect its disengagement from the mower.

To secure the handles in proper relation to each other, means are provided for connecting the rear end of the main handle with the auxiliary handle and the preferred means is a brace which extends from the rear end of the main handle to the auxiliary handle at a point intermediate the ends of the latter. The preferred type of brace is a doubled spring wire 12, terminating at its extremities in eyes 13; this brace is slipped under the auxiliary handle and its arms which tend to spring apart, are caused to cross each other so as to produce a closed loop-clamp 14, which will bind tightly on the auxiliary handle. The eyes 13 are caused to engage opposite ends of the handle bar 4 of the main handle 3, and by the crossing of the arms, said eyes tend to move toward each other and thus wedge tightly on the tapered ends of the handle bar 4.

I have found in practice that in operation upon rough or uneven sod there is a tendency at times for a relative independent lateral movement between the handles which interferes in a limited degree with the proper manipulation of the mower especially when the latter is pushed obliquely up and down the terrace, and to guard against such lateral movement, the eyes 13 are provided with inwardly projecting terminals 15, which lie flatly against the handle bar 4 and thus give the eyes in effect an extended bearing thereon for the purpose of preventing such twisting movement of the main handle as would cause the same or the auxiliary handle to move out of the same vertical plane. I have also found that this tendency toward lateral movement—as indicated by the dotted line position of the brace 12, in Fig. 5, is guarded against by the use of a block 16 secured upon the auxiliary handle to give the same a wider engagement with the clamping loop 13, and hence tending to more effectually resist independent lateral movement between the handles, and in this connection it will be noted that the lower end of the loop 14 provides a convenient point of attachment for a grass catcher. The grass catcher is not shown as it forms no part of the invention.

As well known it is difficult to properly mow a high terrace with an ordinary lawn mower and because of this, it is common for a person mowing a high terrace from a point at the top thereof to attach a rope to the mower whereby it may be lowered to the bottom of the terrace and then drawn back to the top, as with the ordinary mower on a terrace which in height materially exceeds double the length of the mower handle, it is usually necessary for the operator to run the mower in a direction substantially parallel to the top of the terrace, and hence to walk upon the latter and as it is difficult to maintain a footing upon the terrace in mowing in the manner mentioned, the latter is injured more or less.

A terrace, which could ordinarily be completely mowed by operating from the top and also from the bottom, cannot be mowed efficiently if a building rises at the crest or top of the terrace or if a fence or other obstruction is disposed at the bottom of the terrace. For these reasons, I have provided the auxiliary handle by the use of which the terrace may be mowed from the top, if the top is unobstructed and there is a fence for example at the bottom or from the bottom or sidewalk, where the bottom of the terrace is unobstructed, but the top merges substantially into the building line; and by operating the auxiliary handle from both the top and bottom, where both are unobstructed an extremely high terrace may be mowed without walking thereon. It is obvious of course, that to mow the terrace properly, the main handle should stand at substantially the same angle to the terrace as it stands when operating on a level lawn, and for this reason a mere extension of the main handle would be impracticable and for the same reason in mowing terraces of different pitch or inclination it is necessary to provide means whereby the angle between the handles may be slightly varied and for this purpose the brace is adapted to be adjusted lengthwise of the auxiliary handle as indicated by dotted lines in Fig. 1, this adjustment changing the angle of the auxiliary handle to the terrace but not materially affecting the angle of the main handle thereto, so that the mower shall always stand in a position with respect to the surface mowed, for most efficacious results.

To remove the auxiliary handle, the upper ends of the arms of the brace are moved apart to withdraw the eyes 13 from engagement with the handle bar 4, and leave said arms free to move inwardly past each other. The brace can be readily slipped off the auxiliary handle and the latter is free to swing downward so that the hooks 10 may be readily withdrawn from engagement with the yoke 2.

From the above description it will be apparent that I have produced an auxiliary handle for lawn mowers possessing the features of advantage enumerated as desirable and I wish it to be understood that while I have illustrated and described the preferred embodiment of the invention, I do not desire to be restricted to the exact details of construction shown and described as obvious modifications will suggest themselves to one skilled in the art.

I claim:

1. The combination with a lawn mower having a main handle, of an auxiliary handle arranged below said main handle and extending at an acute angle thereto, and means securing said main and auxiliary handles in rigid relation.

2. The combination with a lawn mower having a main handle, of an auxiliary handle arranged below the main handle and secured at its front end in a substantially rigid relation to said main handle, and a brace extending from the auxiliary handle upward and secured to the main handle.

3. The combination with a lawn mower having a main handle, of an auxiliary handle, said handles being arranged in angular relation converging toward the mower and secured thereto, a brace extending between and connected to said handles at the rear of the mower, and means for preventing independent lateral movements of said handles.

4. The combination with a lawn mower having a main handle, of an auxiliary handle arranged below the main handle and secured at its front end in a substantially rigid relation to said main handle, and a brace extending from the auxiliary handle upward and detachably secured to the ends of the handle bar of the mower handle.

5. The combination with a lawn mower having a main handle provided with a handle bar, of an auxiliary handle arranged below the main handle and secured at its front end in a substantially rigid relation to said main handle, and a brace extending from the auxiliary handle upward and detachably secured to the ends of said handle bar, said brace consisting of a doubled wire clamped to the auxiliary handle and fitting and pressing inwardly on the ends of said handle bar.

6. The combination with a lawn mower having a main handle provided with a handle bar, of an auxiliary handle arranged below the main handle and secured at its front end in a substantially rigid relation to said main handle, and a brace extending from the auxiliary handle upward and detachably secured to the ends of said handle bar, said brace consisting of a doubled wire clamped to the auxiliary handle and provided at its upper ends with eyes fitting around the extremities of said handle bar and pressing inwardly thereon.

7. The combination with a lawn mower having a main handle with a handle bar, of an auxiliary handle arranged below the main handle and secured at its front end in a substantially rigid relation to said main handle, and a brace extending from the auxiliary handle upward and detachably secured to the ends of said handle bar, said brace consisting of a doubled wire clamped to the auxiliary handle and provided at its upper ends with eyes fitting around the extremities of said handle bar and pressing inwardly thereon, and ending in inwardly extending terminals fitting flatly against the said handle bar.

8. The combination with a lawn mower provided with a main handle having a yoke securing said handle to the mower, of an auxiliary handle arranged below and extending at an acute angle to said main handle and provided at its front end with a pair of downturned hooks engaging said yoke, and a brace connecting the auxiliary handle intermediate its ends with the rear portion of the main handle and holding said handles in fixed relation to each other.

9. The combination with a lawn mower having a main handle secured thereto, of an auxiliary handle, said handles being arranged in angular relation converging toward the mower, means detachably securing said auxiliary handle at its front end to said main handle, and a brace connecting the rear end of the main handle to the auxiliary handle at a point intermediate the ends of the latter.

10. An auxiliary handle for the operation of lawn mowers, comprising a main arm having means at one end for securing it to one end of the main handle of the mower, and a brace for securing it rigidly to the other end of the main handle of the mower.

11. An attachment for lawn mowers, comprising an extensible arm having means for securing one end thereof to the lawn mower handle, and a brace for spacing the arm from the handle bar of the lawn mower.

In testimony whereof I affix my signature, in the presence of two witnesses.

JUSTIN E. PAGE.

Witnesses:
H. C. RODGERS,
G. Y. THORPE.

Copies of this patent may be obtained for five cents each, by addressing the "Commissioner of Patents, Washington, D. C."